United States Patent [19]

Herzog

[11] Patent Number: 4,906,883
[45] Date of Patent: Mar. 6, 1990

[54] ARRANGEMENT FOR EDGEWISE WOUND POLE WINDING

[75] Inventor: Gordon W. Herzog, Peterborough, Canada

[73] Assignee: General Electric Canada Inc., Mississauga, Canada

[21] Appl. No.: 327,446

[22] Filed: Mar. 22, 1989

[30] Foreign Application Priority Data

May 19, 1988 [CA] Canada .................................. 567252

[51] Int. Cl.[4] .............................................. H02K 3/04
[52] U.S. Cl. .................................... 310/208; 310/201; 310/269
[58] Field of Search ............... 310/208, 269, 260, 270, 310/254, 261, 218, 42, 162, 205, 179, 180, 201, 194

[56] References Cited

U.S. PATENT DOCUMENTS

| | | | |
|---|---|---|---|
| 3,005,119 | 10/1961 | Schmitt | 310/61 |
| 4,143,290 | 3/1979 | Mizukami | 310/270 |
| 4,321,497 | 3/1982 | Long | 310/201 |
| 4,543,503 | 9/1985 | Kaminski | 310/270 |

FOREIGN PATENT DOCUMENTS

| | | | |
|---|---|---|---|
| 0218845 | 12/1983 | Japan | 310/208 |
| 1029333 | 7/1983 | U.S.S.R. | 310/269 |

Primary Examiner—R. Skudy
Attorney, Agent, or Firm—R. A. Eckersley

[57] ABSTRACT

A winding arrangement for a rotor pole in a synchronous machine having edgewise wound conductors forming a coil for the pole, the pole having at each end an end plate to provide curved corner portions for the winding. The conductor has a slot extending through it with the walls of the slot parallel to the edges of the conductor. The slot is provided in the conductor at the corner region where the edgewise wound conductor is to bend around the corner. The slot reduces the upset which occurs at the inner edge of the conductor where it bends, and it also permits the conductor to follow the curved corner portion more closely.

2 Claims, 2 Drawing Sheets

ARRANGEMENT FOR EDGEWISE WOUND POLE WINDING

BACKGROUND OF THE INVENTION

This invention relates to an improved winding arrangement for the pole of a dynamoelectric machine, and in particular it relates to an improved edgewise wound winding arrangement suitable for the poles in a large dynamoelectric machine.

In a large dynamoelectric machine such as, for example, a synchronous machine, the rotor poles are usually wound with conductors of generally rectangular cross-section which may be wound edgewise and extend substantially from top to bottom of the pole. To provide curved corner regions, there is normally an end plate mounted at each end of the pole. Each end plate thus provides two curved corners. When such a conductor bends around a corner of the pole, there is a tendency of the conductor to leave a gap in the region where the conductor leaves the pole proper at a corner and begins to bend around the end plate. This is due to the inherent characteristics of the conductor including an inability to make sharp bends. There is also a tendency for the conductor to leave a gap in the region of the actual bend. In addition, because the outer edge of the conductor is stretched and the inner edge is compressed around the bend, the inner edge is upset, that is, the inner edge region is forced outwardly or becomes thicker. In order to reduce the gap in the region where the pole and the end plate abut, it is known to "taper" the pole laminations, that is, to reduce the laminations slightly in size and thereby to extend the bending region for the conductor. It is also known to insert filler strips in gaps left between the end plate and the conductor. It is sometimes necessary to increase the size of the end plate to carry the conductors if the gap between the conductors and the end plate is too great. Also, it is necessary to remove the upset at the inner edge of the bent conductor so that the coil formed will be compact and not distorted. This may be done by grinding, subsequent pressing, or a combination of both. No matter how it is done, the removal of the upset is time consuming and increases the labour costs.

Some low speed synchronous dynamoelectric machines do not have end plates. Instead, for example, corners may be machined on the pole itself, or the radius at the corner may be replaced by a bevel.

In summary, the inside radius of the bend is determined by the physical characteristics of the conductor. It would be desirable to have the conductor, for a given radius of bending, conform more closely to the pole and end plate. In addition, it would be very desirable to reduce the upset at the inner edge of the conductor so that the removal of the upset would be less time consuming and more efficient.

SUMMARY OF THE INVENTION

The present invention prepares the conductor by providing a slot, in the region of the bend, extending through the conductor and parallel to the edges of the conductor. The conductor is then able to bend more readily, can conform more readily to the pole and end plate, and will have a reduced upset in the bend region. In wide conductors, it may be advantageous to use more than one slot.

It is therefore an object of the invention to provide an improved winding arrangement for the poles of a large dynamoelectric machine.

It is another object of the invention to provide an improved winding arrangement for winding a conductor edgewise on the rotor poles of a large synchronous machine in which the upset of the conductor in the bending region is reduced.

It is yet another object of the invention to provide for the pole winding in a large synchronous machine a conductor having a slot extending therethrough in the region of each bend which occurs in winding the conductor edgewise around the pole, to reduce the upset at the inside edge and to permit a greater degree of bending.

Accordingly there is provided an edgewise wound pole winding arrangement for a dynamoelectric machine having at least one pole having curved corner portions, comprising a conductor having a generally rectangular cross-section for winding edgewise around the pole, the conductor having at least one slot therethrough in the region the conductor will bend around the curved corner portions for facilitating the bending of the conductor.

BRIEF DESCRIPTION OF THE DRAWINGS

The invention will be described with reference to the accompanying drawings, in which.

DESCRIPTION OF THE PREFERRED EMBODIMENT

Figure 1:
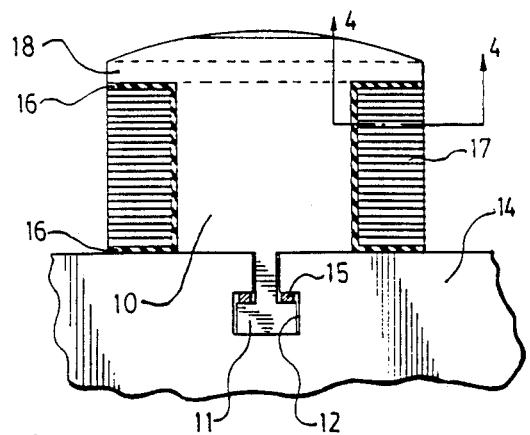
FIG. 1 is an end view, in section, showing a rotor pole for a dynamoelectric machine.
Figure 2:
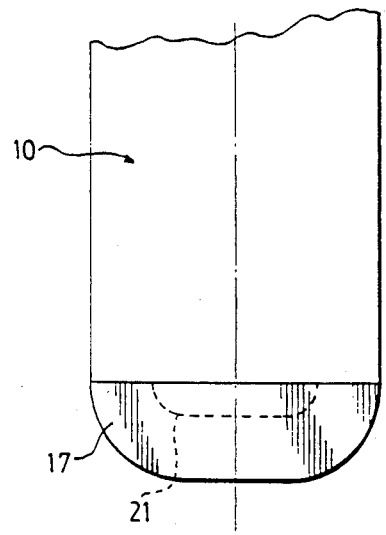
FIG. 2 is a partial plan view of the rotor pole.
Figure 3:
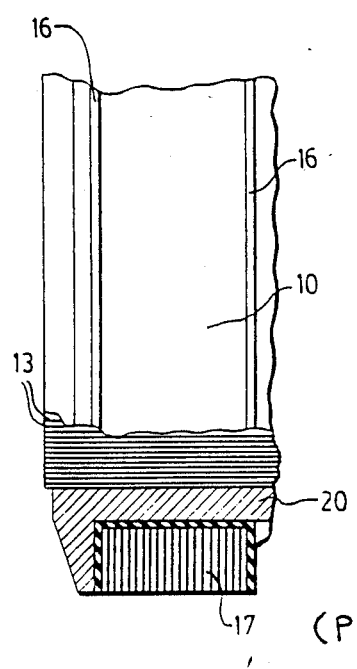
FIG. 3 is a side view, partly in section, of the rotor pole.

Referring to FIGS. 1, 2 and 3, there is shown a rotor pole of a typical prior art synchronous machine. A pole 10 is made up of a stack of laminations 13 each having a T-shaped projection 11 for securing the pole 10 to a rotor structure 14. The T-shaped projections 11 are inserted into a T-shaped slot 12 in rotor structure 14. Then wedges 15 are driven into spaces between the wall of slot 12 and the projections 11, as shown, to hold the pole laminations 13 securely to the rotor structure 14. An insulating collar 16 insulates edgewise wound conductors 17 from rotor structure 14 and from top portion 18 of pole 10.

Figure 4:
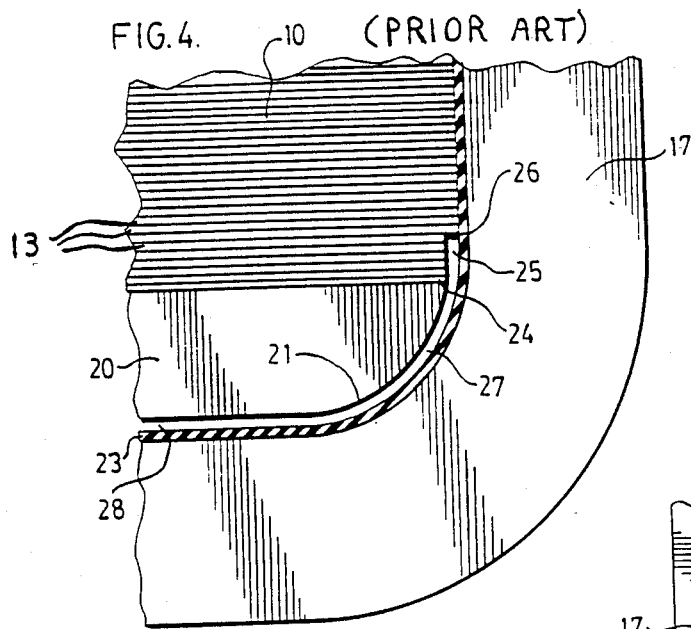
FIG. 4 is a partial view of a corner of a pole in a prior art machine, in section, and taken along line 4—4 of FIG. 1.

An end plate 20 is mounted at each end of pole 10 and has a curved portion 21 around which conductors 17 bend. FIG. 4 (a sectional view along line 4—4 of FIG. 1) shows an enlarged view of a portion of pole 10 and end plate 20 with a curved portion 21.

Referring to FIG. 4, the laminations 13, which form pole 10 are shown. The conductor 17 is separated from pole 10 by a layer of insulation 23. The laminations 13, just before the pole 10 abuts with end plate 20 at corner 24, are cut away or are of reduced size to leave a space 25. This is referred to as "tapering" the pole and, of course, increases the labour costs. The space 25 serves to assist in the bending of conductor 17 around curved portion 21, that is, the space 25 permits the conductor 17 to start bending slightly sooner at point 26 rather than at the beginning of curved portion 21. In addition, the inside bending radius or corner radius for a given conductor often is such that the curve or bend in the conductor does not follow the curved portion 21 closely, leaving a gap 27 along the curved portion 21 and a gap 28, as shown, adjacent the curved portion 21. These gaps 27 and 28 must be filled using filler strips. Also, the bending of the conductor causes the inner edge of the conductor 17 to be upset, that is to increase in thickness. As was previously mentioned, the upset must be removed by grinding or pressing or a combination of both. The tapering of the pole, the filling of the gaps with filler strips, and the removal of the upsets all increase the labour costs.

Figure 5:
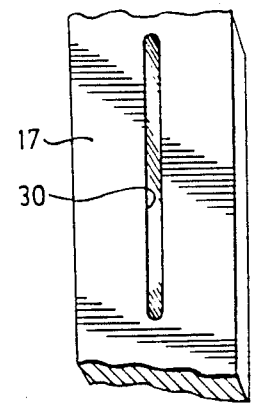
FIG. 5 is a view of a part of a conductor suitable for edgewise winding around a pole, and showing a slot according to the invention.

Referring now to FIG. 5, there is shown a portion of a conductor 17 which has a slot 30 extending through it from one side to the other. The conductor 17 has a rectangular cross-section with the width at least several times the thickness. The slot 30 in conductor 17 has walls or sides parallel to the edges of conductor 17. The slot 30 is machined or cut into conductor 17 at a location along the conductor that will extend substantially over a corner when the conductor is bent. In a very wide conductor, more than one slot may be advantageously used.

Figure 6:
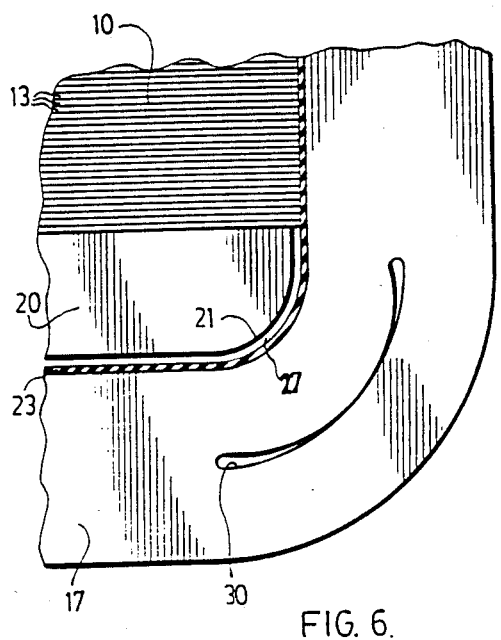
FIG. 6 is a partial view of a corner of a pole, in section, showing a conductor with a slot wound at a corner.

Referring to FIG. 6, there is shown a sectional view of a corner region (similar to the view in FIG. 4) but with a conductor 17 having a slot 30 in accordance with the invention. It will be seen that the walls or sides of slot 30 have moved together along the central region of the slot. It will be noted that for the same size conductor (a) it is not necessary to taper the pole 10 to form space 25 (FIG. 4), (b) the gaps 27 and 28 have been considerably reduced in size and require less filler material, and (c) the upset at the inner edge of conductor has been reduced. The upset is not eliminated, but is reduced. All these factors tend to reduce labour costs. Because the conductor 17 tends to follow the curved portion 21 more closely, and the size of gaps 27 and 28 are smaller, the size of the end plate 20 may be reduced.

It will be recalled that some machines, particularly some slow speed synchronous dynamoelectric machines, do not have end plates. Rather corners may, for example, be machined on the pole. This invention is applicable to this type of machine having edgewise wound coils. If the conductor used is provided with at least one slot in the corner region, the conductor will conform more closely to the corner of the pole and the upset of the inner edge will be reduced.

The length of the slot 30 is, of course, sufficient to extend around the curved portion 21. The width of slot 30 may conveniently be determined by trial. It has been found that the width of the conductor is normally between ten and fifty times the thickness of the conductor for desirable results. As the width of the slot 30 is increased and the number of slots is increased, the amount of conductor in the corner region is reduced and this will have a bearing on the width and number of slots.

It is believed the preceding description will provide a complete understanding of the invention which is defined in the appended claims.

What I claim as new and desire to secure by Letters Patent of the United States of America is:

1. An edgewise wound pole winding arrangement for a dynamoelectric machine having at least one pole having curved corner portions, comprising
    a conductor having a generally rectangular cross-section wound edgewise around said pole, said conductor having at least one slot extending therethrough only in each region where said conductor bends around each of said curved corner portions for facilitating the bending of the conductor, each said slot extending longitudinally of said conductor with the side walls defining each said slot being generally parallel to a respective one of said curved corner portions.

2. An edgewise wound pole winding arrangement for a substantially rectangular rotor pole assembly having a rectangular rotor pole and an end plate at each end of said rectangular rotor pole forming curved corner portions of said rotor pole assembly, comprising
    a conductor having a generally rectangular cross-section with sides and edges, the dimension of said sides being at least several times the dimension of said edges, said conductor being wound edgewise around said rotor pole assembly bending around each of said curved corner portions, said conductor having at least one slot defined by slot walls and extending therethrough only in the region the conductor bends around each of said curved corner portions for reducing the upset of the conductor in the region of each of said curved corner portions, each said slot extending longitudinally of said conductor with said slot walls being substantially parallel to said edges.

* * * * *